US012710651B2

(12) United States Patent
Thomae

(10) Patent No.: US 12,710,651 B2
(45) Date of Patent: Aug. 18, 2026

(54) PROJECTION UNIT COMPRISING A VOLUME HOLOGRAM HAVING A VOLUME GRATING, AND PROJECTION DEVICE HAVING A PROJECTION UNIT

(71) Applicant: Carl Zeiss Jena GmbH, Jena (DE)

(72) Inventor: Daniel Thomae, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 281 days.

(21) Appl. No.: 18/293,345

(22) PCT Filed: Jul. 11, 2022

(86) PCT No.: PCT/EP2022/069256
§ 371 (c)(1),
(2) Date: Jan. 29, 2024

(87) PCT Pub. No.: WO2023/006397
PCT Pub. Date: Feb. 2, 2023

(65) Prior Publication Data

US 2024/0337842 A1 Oct. 10, 2024

(30) Foreign Application Priority Data

Jul. 30, 2021 (DE) ......................... 102021119887.9

(51) Int. Cl.
*G02B 27/01* (2006.01)
*G02B 5/18* (2006.01)

(52) U.S. Cl.
CPC ....... *G02B 27/0172* (2013.01); *G02B 5/1861* (2013.01); *G02B 2027/0105* (2013.01);
(Continued)

(58) Field of Classification Search
CPC ............................................. G02B 2027/0105
See application file for complete search history.

(56) References Cited

U.S. PATENT DOCUMENTS

2006/0120247 A1 6/2006 Noda et al.
2008/0239424 A1* 10/2008 Mukawa ............ G02B 27/0103
359/205.1

(Continued)

FOREIGN PATENT DOCUMENTS

DE 102007022247 A1 11/2007
DE 102017222621 A1 6/2019

(Continued)

OTHER PUBLICATIONS

International Search Report rendered by the International Bureau of WIPO for PCT/EP2022/069256, dated Oct. 31, 2022, 3 pages.

(Continued)

*Primary Examiner* — Paul C Lee
(74) *Attorney, Agent, or Firm* — Skaar Ulbrich Macari, P.A.

(57) ABSTRACT

A projection unit images a multi-color image having a first and a second wavelength into an exit pupil such that an observer can perceive said image as a virtual image when an eye of the observer is positioned in the exit pupil and the observer views the projection unit at a predefined angle of observation. Each volume grating of the projection unit has a deflection efficiency curve dependent on the angle of observation with a maximal for the predefined angle of observation. The deflection efficiency curves are set equal for a predefined angle range around the predefined angle of observation by virtue of the fact that, for each of the volume gratings applied by exposure, the number of interference maxima applied by exposure is the same and the refractive index modulation for the corresponding wavelength, which refractive index modulation is applied by exposure, is the same.

8 Claims, 4 Drawing Sheets

(52) U.S. Cl.
CPC ................. *G02B 2027/0112* (2013.01); *G02B 2027/0174* (2013.01); *G02B 2027/0178* (2013.01)

(56) References Cited

U.S. PATENT DOCUMENTS

| | | | | |
|---|---|---|---|---|
| 2009/0325078 | A1 | 12/2009 | Davis et al. | |
| 2012/0224062 | A1 | 9/2012 | Lacoste et al. | |
| 2021/0080907 | A1* | 3/2021 | Bablumyan | G02B 27/4211 |
| 2021/0278803 | A1 | 9/2021 | Thomae | |
| 2022/0128778 | A1* | 4/2022 | Kleindienst | G02B 6/4214 |

FOREIGN PATENT DOCUMENTS

| | | | | |
|---|---|---|---|---|
| DE | 102018218404 | A1 | 4/2020 | |
| JP | H06337367 | A | 12/1994 | |
| WO | WO-2011121949 | A1 * | 10/2011 | B60K 35/60 |
| WO | 2019238881 | A1 | 12/2019 | |

OTHER PUBLICATIONS

Written Opinion rendered by the International Bureau of WIPO for PCT/EP2022/069256, dated Oct. 31, 2022, 6 pages.

* cited by examiner

PROJECTION UNIT COMPRISING A VOLUME HOLOGRAM HAVING A VOLUME GRATING, AND PROJECTION DEVICE HAVING A PROJECTION UNIT

PRIORITY

This application claims the priority of German patent application DE 10 2021 119 887.9 filed Jul. 30, 2021, which is hereby incorporated herein by reference in its entirety.

FIELD

The present invention relates to a projection unit, and to a projection device having such a projection unit.

BACKGROUND

In the case of such a projection unit, a volume hologram can be used for deflecting the image to be imaged. Since the deflection efficiency of such volume holograms varies for different wavelengths depending on the viewing angle for a user, this may disadvantageously have the effect that the projected image has an undesirable color cast toward the edge, and this color cast very quickly becomes conspicuous to an observer and is very disturbing. Three wavelengths are generally used in a projection unit, with a respective wavelength for blue, green and red generally being provided. However, it is also possible for only two wavelengths to be used.

SUMMARY

An object of the invention to provide a projection unit in which this difficulty is eliminated as far as possible. Furthermore, the intention is to provide a projection device having such a projection unit.

Since the deflection efficiency profiles for the predetermined angular range are set to be equal by virtue of the fact that, for each of the volume gratings introduced by exposure, the number of interference maxima introduced by exposure (along a predetermined direction) is the same and the refractive index modulation introduced by exposure for the corresponding wavelength is the same for the volume gratings introduced by exposure (which is produced in this way during the introduction of the volume grating by exposure), undesired color casts in the virtual image are advantageously avoided.

The same number of interference maxima introduced by exposure has the effect that the thickness or extent of the volume gratings (in the direction of the interference maxima introduced by exposure and thus along the predetermined direction) varies. In this case, the ratio of the corresponding thicknesses of the volume gratings introduced by exposure is preferably defined such that it corresponds to the ratio of the wavelengths for which the volume gratings are designed. These different thicknesses of the volume gratings introduced by exposure can be attained in particular with high accuracy by virtue of the fact that a separate layer (having the corresponding thickness) is provided for each volume grating, in which layer the corresponding volume grating is then formed. In this case, the predetermined direction corresponds to the direction in which the thickness of the layer is measured or specified.

It is possible here to form each of the separate volume gratings in a corresponding separate layer and then to join the layers as a layer stack (for example adhesive bonding).

Insofar as a volume grating introduced by exposure is mentioned here, that is preferably understood here to mean that the volume grating is exposed and optionally developed or bleached, such that a stable volume grating introduced by exposure is then present.

The exposure for producing the volume grating introduced by exposure can be carried out for example such that a reference wave having a predetermined wavelength (e.g. 532 nm, 460 nm or 640 nm) is directed at a first angle of incidence (e.g. of) 0° onto a layer (which comprises or is formed from a photosensitive volume-holographic material) into which the volume grating is intended to be introduced by exposure, and that a signal wave having the same wavelength is likewise directed onto the layer at a second angle of incidence (e.g. of) 60°, which differs from the first angle of incidence, the reference wave and the signal wave originating from the same laser such that an interference field or interference volume having the desired number of interference maxima arises over the photosensitive volume-holographic material of the layer and the desired refractive index modulation is thus formed. The refractive index change produced is maximal at the interference maxima, such that the interference maxima define the refractive index modulation.

By way of example, photosensitive glasses, dichromate gelatins or photopolymers can be used as photosensitive volume-holographic materials. They can e.g. be applied to a PC film (polycarbonate film) and be correspondingly exposed there.

The refractive index modulation is understood here to mean in particular the absolute value of the maximal refractive index change or variation.

Furthermore, it is possible for provision already to be made of a layer stack having layers for each volume grating. This layer stack can comprise separating layers. However, it is also possible for the layer stack not to comprise separating layers.

The desired volume gratings can then be introduced by exposure in this layer stack.

However, it is also possible to provide a layer having different color receptors for the desired wavelengths and to carry out the exposure in order thus to produce the desired volume gratings. So-called multiplexing may be present in this case. However, it is also possible for the color receptors to be in separate partial layer regions in the layer provided, such that a stack of volume gratings introduced by exposure is again present.

The volume gratings introduced by exposure are identical if each volume grating is scaled to its application wavelength.

The volume gratings can be reflective or transmissive gratings. Likewise, in the case of an image waveguide the volume gratings can also be edge-lit gratings.

The volume hologram can be embedded in a transparent carrier. However, it is also possible for the volume hologram to be formed in the interface of the transparent carrier.

The transparent carrier can also be used as an image waveguide having an input coupling region spaced apart from the volume hologram, the multicolored image being coupled into the image waveguide via said input coupling region. In the image waveguide, the multicolored image can be guided by reflections as far as the volume hologram. The volume hologram then couples out the guided light to the observer.

The transparent carrier can be for example a windshield or some other window of a vehicle. However, it can also be a plane-parallel plate. Furthermore, it is possible for the transparent carrier to have curved interfaces. The transparent carrier of the volume hologram can also be part of an optical system which e.g. is arranged in the dashboard of a vehicle and from there directs the light to the observer by way of the reflection at the windshield.

The transparent carrier can be produced from glass or from plastic.

In particular, the projection unit can be configured such that the virtual image is perceptible in a manner superimposed with the surroundings. For this purpose, the volume hologram is preferably also transmissive to the first and second wavelengths.

The predetermined angular range can be an angular range of 2°, 3°, 4°, 5°, 6°, 7°, 8°, 9°, 10°, 11°, 12°, 13°, 14°, 15°, 16°, 17°, 18°, 19° or 20°. The predetermined angular range can be different in horizontal and vertical directions. In this regard, e.g. the horizontal angle can be 14°-20° and the vertical angle can be 5°-7.5°. The predetermined viewing angle can lie in the center of the predetermined angular range. However, it can also lie outside the center of the predetermined angular range.

A constant efficiency ratio for the predetermined angular range is understood here to mean in particular that the efficiency ratio for the predetermined angular range changes between the wavelengths (preferably relative to the maximal value of the efficiency ratio in the predetermined angular range) by not more than 1%, 2%, 3%, 4%, 5%, 6%, 7%, 8%, 9%, 10%, 11%, 12%, 13%, 14%, 15%, 16% or 17%.

It goes without saying that the features mentioned above and the features yet to be explained hereinafter can be used not only in the specified combinations but also in other combinations or on their own, without departing from the scope of the present invention.

The invention will be explained in even greater detail below on the basis of exemplary embodiments with reference to the accompanying drawings, which likewise disclose features essential to the invention. These exemplary embodiments are provided for illustration only and should not be construed as limiting. For example, a description of an exemplary embodiment having a multiplicity of elements or components should not be construed as meaning that all of these elements or components are necessary for implementation. Rather, other exemplary embodiments may also contain alternative elements and components, fewer elements or components, or additional elements or components. Elements or components of different exemplary embodiments can be combined with one another, unless indicated otherwise. Modifications and variations that are described for one of the exemplary embodiments can also be applicable to other exemplary embodiments. In order to avoid repetition, elements that are the same or correspond to one another in different figures are denoted by the same reference signs and are not explained repeatedly.

DETAILED DESCRIPTION

Figure 1:
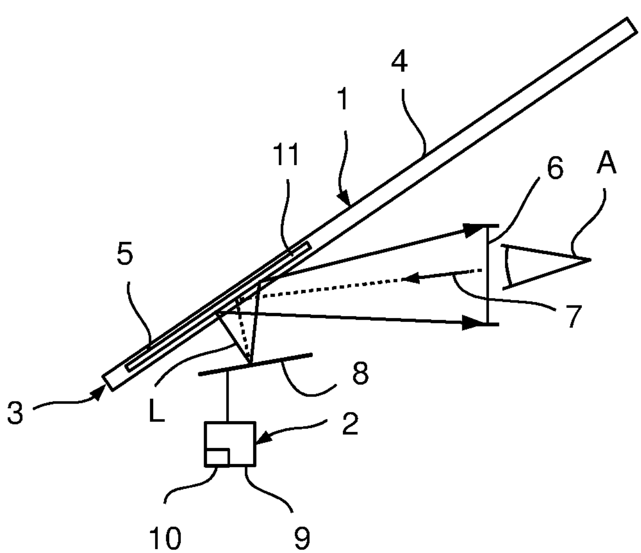
FIG. 1 shows a schematic view of a first embodiment of the holographic projection device.

In the embodiment shown in FIG. 1, the holographic projection device 1 comprises an image module 2 for generating a multicolored image and a projection unit 3 according. The projection unit 3 here comprises a holographic beam splitter 5, integrated into a windshield 4 of a vehicle, at which the multicolored image (the beam path of a light beam L is depicted as representative) is deflected in the direction of an exit pupil 6 of the projection unit 3 such that a user who positions their eye A in the exit pupil 6 can perceive the multicolored image as a virtual image when they look along a predetermined viewing direction 7 at the projection unit 3 (or in this case at the holographic beam splitter 5).

The image module 2 can comprise an image generator 8 and a control unit 9 having a processor 10, wherein the control unit 9 controls the image generator 8 for generating the multicolored image. The image generator 8 can be an LCD module, an OLED module, an LCoS module, or a tilt mirror matrix. Furthermore, the image generator can comprise a diffusing plate, which is not depicted here. The system can likewise have a light source, such as e.g. lasers, which is not directly assigned to the image generator and serves to illuminate the image generator, which light source is not depicted.

The multicolored image is generated by means of the image generator 8 in that, for example, three color sub-images having different wavelengths are generated. For example, they can be a blue color sub-image having a wavelength of 460 nm, a green color sub-image having a wavelength of 532 nm, and a red color sub-image having a wavelength of 640 nm. The color sub-images can be generated simultaneously or alternately in temporal succession so quickly that only the superimposition is perceptible as a multicolored image for a user.

Figure 2:
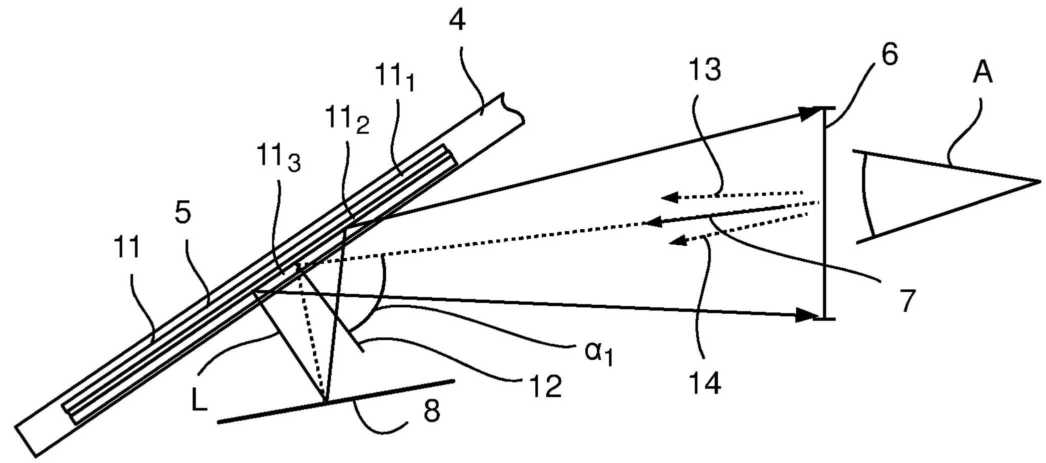
FIG. 2 shows an enlarged detail illustration of the projection device from FIG. 1.

As is evident in particular in the enlarged partial view in FIG. 2, the holographic beam splitter 5 comprises a layer stack 11 having three photopolymer layers $\mathbf{11}_1$, $\mathbf{11}_2$ and $\mathbf{11}_3$ stacked one on top of another, a respective volume-holographic grating being written into one of the photopolymer layers $\mathbf{11}_1$-$\mathbf{11}_3$ for each of the three wavelengths. Each of the three volume-holographic gratings is configured such that it is reflective for one of the three wavelengths mentioned (for example, with a bandwidth of +3% of the central wavelength) and transmits the remaining wavelengths. In this case, the reflection should be understood as diffraction at the grating structure of the volume hologram. In this case, the reflectivity of the individual volume-holographic gratings, which corresponds to the diffraction efficiency, as will also be described in detail hereinafter, is set such that an effective reflectivity of a maximum of approximately 53% is present. This stems principally from the fact that for the outlined purpose of use in the windshield 4 of the vehicle, reflectivities of 100% are impermissible for safety reasons. For other applications where such safety aspects are not important, the volume-holographic gratings can certainly be designed to have a maximum reflectivity of greater than 53%.

Figure 3:
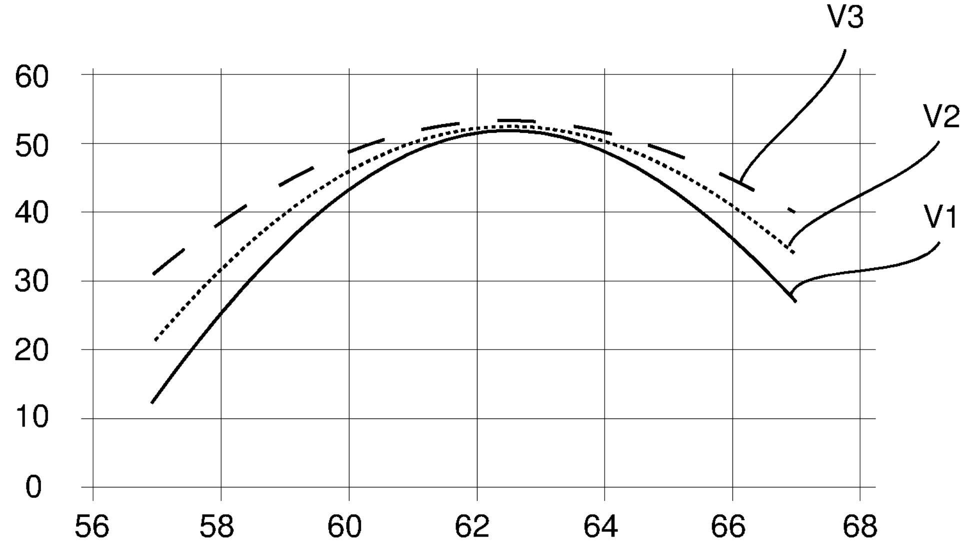
FIG. 3 shows an illustration of the deflection efficiency of known volume gratings for three different wavelengths.

The holographic beam splitter 5 is designed for the predetermined viewing direction 7 with a predetermined viewing angle $\alpha_1$ of 62.5° (relative to the normal 12 at the point where the normal 12 intersects the windshield 4). However, viewing directions 13 and 14 deviating therefrom may also occur. If photopolymer layers having the same thickness and designed for 62.5° were used as in a conventional holographic beam splitter, different reflectivities occur for the deviating viewing directions since a viewing-angle-dependent reflection efficiency profile is present for each of the volume-holographic gratings, and is different for the individual volume-holographic gratings. These reflectivities as a function of the viewing angle $\alpha$ are shown in FIG. 3, the viewing angle in degrees being plotted along the abscissa and the diffraction efficiency and thus the reflectivity in percent being plotted along the ordinate.

The curve V1 shows the diffraction efficiency of the grating for 460 nm, the curve V2 shows the diffraction efficiency for the wavelength of 532 nm, and the curve V3 shows the diffraction efficiency for the wavelength of 640 nm. Each of the curves V1-V3 has its maximum at the predetermined viewing angle $\alpha_1$ of 62.5° and then falls in terms of the diffraction efficiency with increasing or decreasing viewing angle, such that the diffraction efficiency profiles shown in FIG. 3 are present. This behavior shown in FIG. 3 would have the effect that, for example, the perceptible virtual image has an increasing red cast with increasing angular deviation from the predetermined viewing angle. In the case of large exit pupils 6, as shown in FIGS. 1 and 2, these different viewing angles for the user are already present for different positions in the virtual image. In this regard, the predetermined viewing angle is only fulfilled when the image center is viewed. The viewing direction 13 or 14 may already be present at the image edge, such that the individual perceived virtual image would already have a red cast away from the image center.

The viewing directions 13 and 14 thus define a predetermined angular range around the predetermined viewing direction 7 for which at least one true-color projection of the virtual image into the exit pupil 6 should be present. This can involve e.g. a range of ±2° relative to the predetermined viewing angle $\alpha_1$.

In order then to attain a true-color projection for which e.g. no red cast is perceptible, the angle-dependent deflection efficiency profiles of the individual volume-holographic gratings are designed and produced such that they are the same for the respective wavelengths. This is achieved by virtue of the fact that the volume gratings introduced by exposure in the photopolymer layers $\mathbf{11}_1$-$\mathbf{11}_3$ each have the same number of interference maxima introduced by exposure and the refractive index modulation introduced by exposure for the corresponding wavelength is the same for the volume gratings introduced by exposure. This then has the effect that the individual photopolymer layers $\mathbf{11}_1$-$\mathbf{11}_3$ have different thicknesses, as is illustrated schematically and not to scale in FIG. 2. What is essential, of course, is the thickness of the volume gratings introduced by exposure. This thickness can be defined with the necessary accuracy in the simplest manner by way of the thickness of the photopolymer layers $\mathbf{11}_1$-$\mathbf{11}_3$.

Since, disregarding the refractive index dispersion of the photopolymer, the distance between interference maxima is a linear function of the wavelength, it transpires that the layer thicknesses of the photopolymer layers $\mathbf{11}_1$-$\mathbf{11}_3$ correspond to the ratio of the corresponding wavelengths. The refractive index difference for typical photopolymers between blue and red is small enough that it can initially be disregarded. Therefore, the photopolymer layers $\mathbf{11}_1$-$\mathbf{11}_3$ with the corresponding thicknesses are used here.

Figure 4:
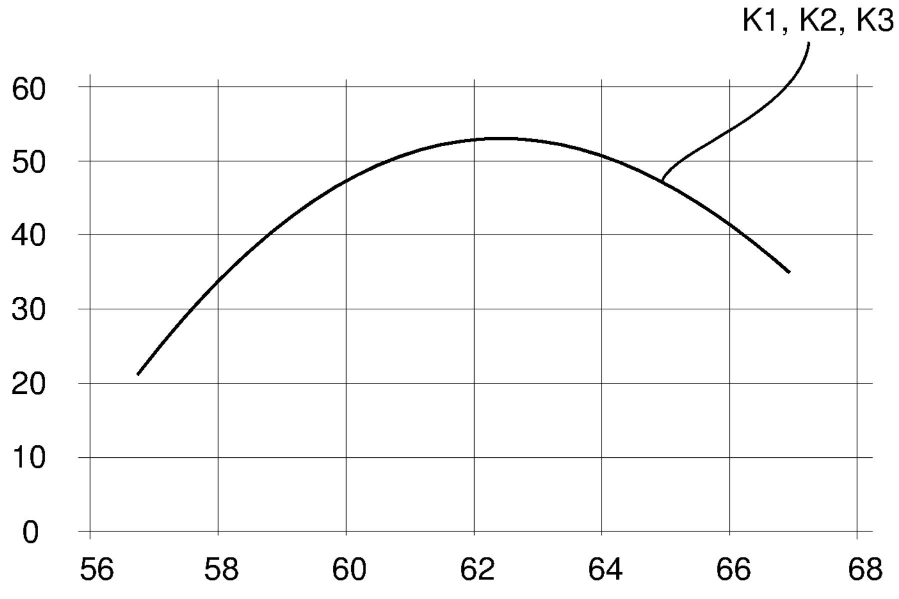
FIG. 4 shows an illustration of the deflection efficiencies for volume gratings for the wavelengths from FIG. 3.

The reflectivities of the volume-holographic gratings thus formed in the three photopolymer layers $\mathbf{11}_1$-$\mathbf{11}_3$ as a function of the viewing angle $\alpha$ are illustrated in FIG. 4 in the same way as in FIG. 3, the curves K1, K2 and K3 lying one above another so exactly that they are indistinguishable. In this case, the curve K1 shows the diffraction efficiency of the grating for 460 nm, the curve K2 shows the diffraction efficiency for the wavelength of 532 nm, and the curve K3 shows the diffraction efficiency for the wavelength of 640 nm. The refractive index modulation is in each case 0.014 and the layer thickness of the photopolymer layer $\mathbf{11}_1$ for the wavelength of 460 nm is 8.65 μm, the layer thickness of the photopolymer layer $\mathbf{11}_2$ for the wavelength of 532 nm is 10 μm, and the layer thickness of the photopolymer layer $\mathbf{11}_3$ for the wavelength of 640 nm is 12.03 μm. The refractive index of the photopolymer layers $\mathbf{11}_1$-$\mathbf{11}_3$ is 1.5 here for simplification.

The three photopolymer layers $\mathbf{11}_1$-$\mathbf{11}_3$ of the holographic beam splitter 5 can be produced for example such that the three photopolymer layers $\mathbf{11}_1$-$\mathbf{11}_3$ are exposed separately such that the desired volume grating can be introduced into each of the 3 layers $\mathbf{11}_1$-$\mathbf{11}_3$ by exposure. The individual layers are then adhesively bonded to one another in order to form the layer stack 11, which is then embedded into the windshield.

However, it is also possible to provide a finished three-layer substrate having the photopolymer layers $\mathbf{11}_1$-$\mathbf{11}_3$, into which the three volume gratings are introduced by exposure. Photopolymer layers $\mathbf{11}_1$-$\mathbf{11}_3$ which are as selective as possible for the individual wavelengths are used for this purpose. The layer stack thus produced is then embedded into the windshield 4.

Furthermore, it is also possible to provide one layer, in which color receptors for the abovementioned wavelengths (e.g. for red, green and blue) are present only with different layer thicknesses. By means of the corresponding exposure, the desired different volume gratings can then be introduced by exposure. This layer having the volume gratings is then embedded into the windshield.

As can furthermore be gathered from FIG. 4, the maximum reflectivity for the predetermined viewing angle $\alpha_1$ is approximately 53%, and so the transmission is at least 47%.

Figure 5:
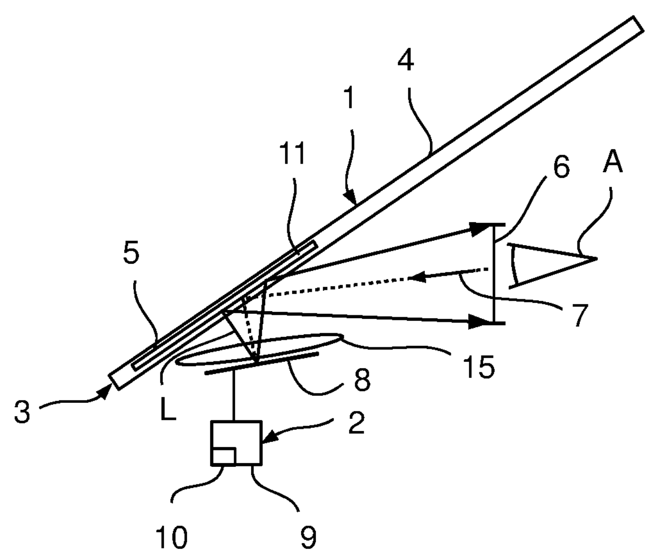
FIG. 5 shows a further embodiment of the holographic projection device.

Of course, it is possible for the projection device 1 to comprise even further optical elements, for example for minimizing aberrations. In this regard, mirrors and lenses can be used. As illustrated schematically in FIG. 5, for example, an optical unit 15 comprising a plurality of optically effective surfaces can be arranged between the image generator 8 and the holographic beam splitter 5, with the optical unit 15 being depicted schematically here as a lens. This optical unit 15 is necessary for correcting optical aberrations, such as dynamic distortion, which inevitably occur in the depicted system from FIG. 1 during the imaging of the image generator 8 over the volume hologram 5 as solely effective surface. In this case, the volume hologram 5 can also be placed into the optical system 15 such that at the windshield 4 conventional Fresnel reflection is used for specularly reflecting the image into the driver's field of view. If the volume hologram is placed into the optical system 15, the diffraction efficiency of the volume hologram can be greater than 53%.

Figure 6:
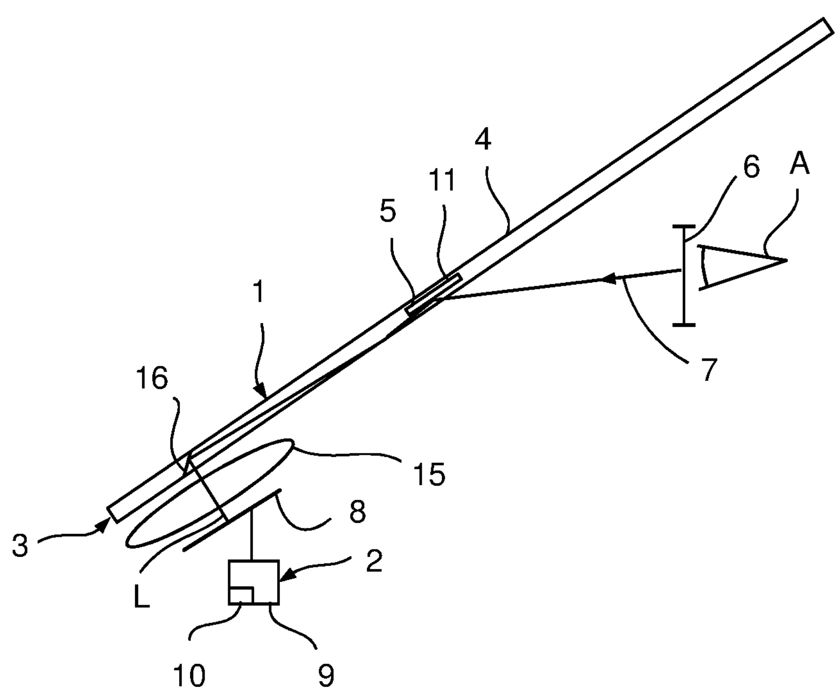
FIG. 6 shows a further embodiment of the holographic projection device.

Furthermore, FIG. 6 shows a variation in which the light from the image generator 8 is coupled into the windshield 4 via a coupling element 16 (for example deflection mirror)

and is guided therein by way of at least one reflection as far as the photopolymer layer stack 11, which carries out the described output coupling.

Instead of the windshield 4, any other transparent body can also be used for the projection device 1. This transparent body can be configured as a plane-parallel plate. However, it is also possible for at least one interface (for example front and/or rear side) to be configured in curved fashion.

The photopolymer layer stack 11 can be embedded in the transparent body, as shown with the windshield in FIGS. 1, 2, 5 and 6. However, it is also possible for the photopolymer layer to be formed on the front side or rear side of the transparent body. Furthermore, a capping layer can also provided on the photopolymer layer stack 11.

The projection device 1 can also be configured as being mountable on the user's head and for this purpose can comprise a holding device 32, which is mountable on the user's head and can be configured, for example, in the manner of a conventional spectacle frame. In this case, the projection device 1 can comprise a first and a second spectacle lens 33, 34, which are attached to the holding device 32. The holding device 32 with the spectacle lenses 33, 34 can be configured for example as sports goggles or spectacles, sunglasses, and/or spectacles for correcting defective vision, it being possible for the virtual image to be superposed onto the user's field of view via the first spectacle lens 33.

Figure 7:
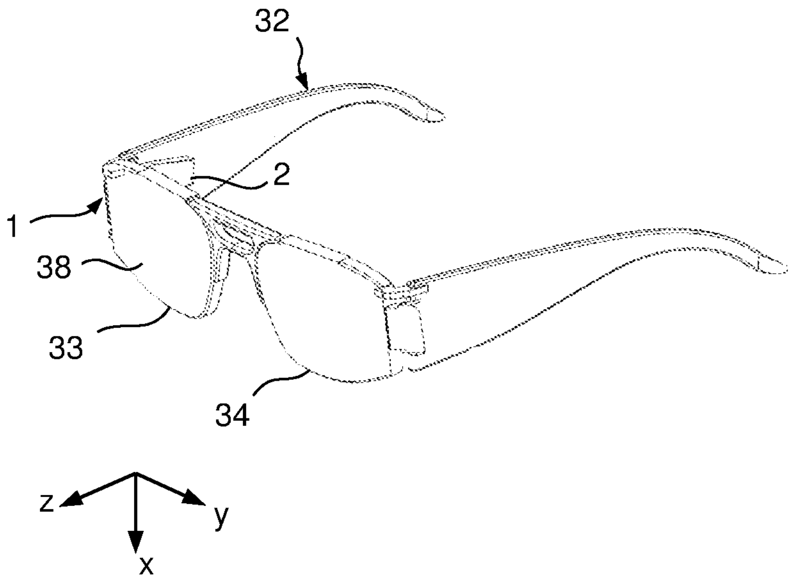
FIG. 7 shows a further embodiment of the holographic projection device.

The image module 2 can be arranged in the region of the right eyeglass temple of the holding device 32, as illustrated schematically in FIG. 7.

Figure 8:
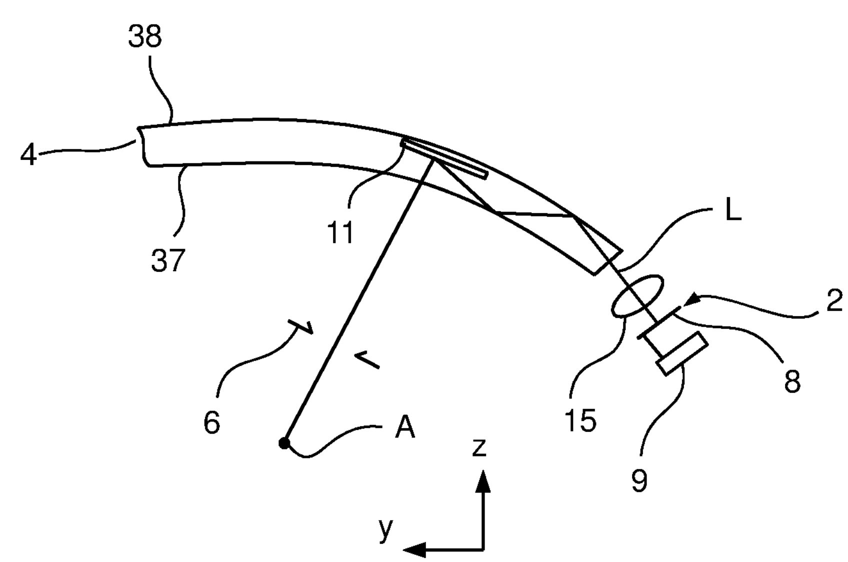
FIG. 8 shows a partial sectional view of the projection device from FIG. 7.

As can be best seen from the enlarged, schematic partial sectional view in FIG. 8, the first spectacle lens 33 comprises a back side 37 and a front side 38. The back side 37 and the front side 38 are curved here. However, it is also possible that they are planar. The curvature can be a spherical curvature or an aspherical curvature.

If the virtual image is intended to be visible in a manner superimposed with the surroundings, an effective deflection efficiency in the range of, for example, 50% may again be present. If the surroundings are intended not to be visible, the deflection efficiency selected can be greater.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A projection unit which images a fed multicolored image having a first and a second wavelength into an exit pupil such that an observer can perceive said image as a virtual image when an eye of the observer is positioned in the exit pupil and the observer looks at the projection unit at a predetermined viewing angle, the projection unit comprising:

a volume hologram, which deflects the multicolored image into the exit pupil for imaging purposes, wherein the volume hologram comprises a volume grating introduced by exposure for each wavelength of the color sub-images, the volume grating having a respective deflection efficiency profile which is dependent on the viewing angle and which is maximal for the predetermined viewing angle, and wherein the deflection efficiency profiles for a predetermined angular range around the predetermined viewing angle are set to be equal by virtue of the fact that, for each of the volume gratings introduced by exposure, the number of interference maxima introduced by exposure is the same and refractive index modulation introduced by exposure for the corresponding wavelength is the same for the volume gratings introduced by exposure.

2. The projection unit of claim 1, wherein each volume grating is formed in a separate layer.

3. The projection unit of claim 2, wherein a thickness of the layers is chosen such that a ratio of the layer thicknesses corresponds to a ratio of wavelengths for which the volume gratings are designed.

4. The projection unit of claim 1, wherein the volume gratings are configured as reflective volume gratings.

5. The projection unit of claim 1, wherein the volume hologram is embedded in a transparent carrier.

6. The projection unit of claim 1, wherein the projection unit includes an image waveguide, into which the multicolored image is couplable for feeding purposes and is then guided via reflection as far as the volume hologram, which causes the deflection of the multicolored image and hence the output coupling from the image waveguide.

7. The projection unit of claim 1, wherein the fed multicolored image has a third wavelength, and the first wavelength lies in a blue wavelength range, the second wavelength lies in a green wavelength range, and the third wavelength lies in a red wavelength range.

8. A projection device, comprising:

the projection unit of claim 1; and an image module, which generates the multicolored image by generating a first color sub-image having a first wavelength and a second color sub-image having a second wavelength.

* * * * *